Nov. 6, 1923.  
A. CHRISTOPHERSON  
1,473,012  
SHOCKING ATTACHMENT FOR BINDERS  
Filed April 12, 1921  
2 Sheets-Sheet 2
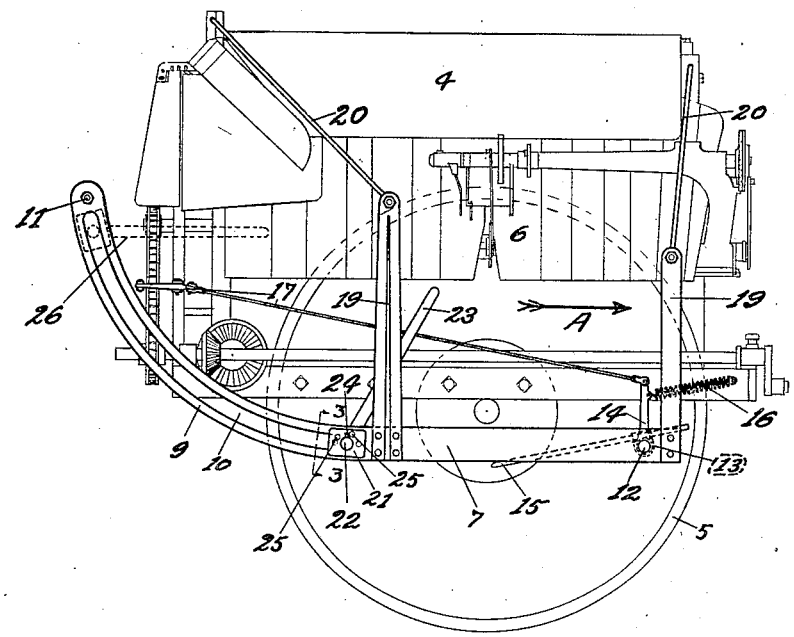
Fig-2-
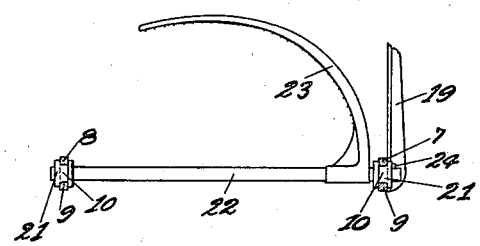
Fig-3-
Inventor  
ARTHUR CHRISTOPHERSON
By *A. E. Carleen*.  
Attorney Patented Nov. 6, 1923.

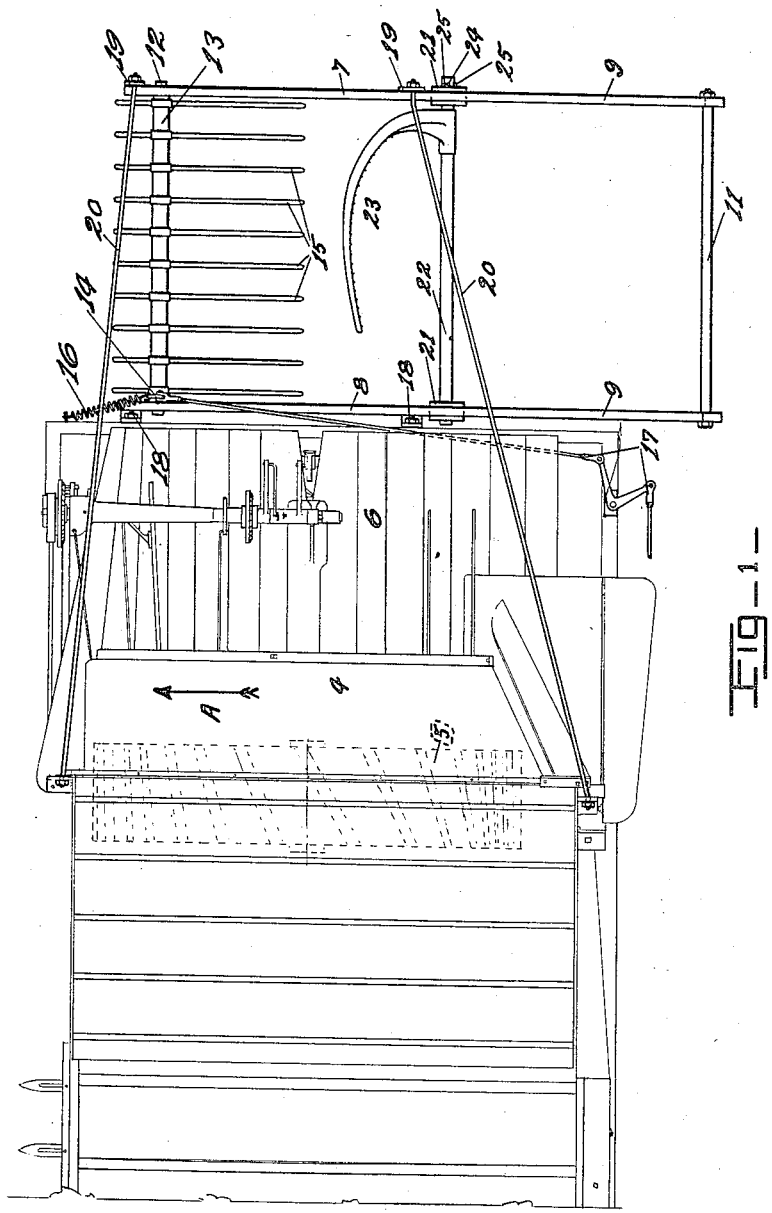

1,473,012

UNITED STATES PATENT OFFICE.

ARTHUR CHRISTOPHERSON, OF OSLO, MINNESOTA.

SHOCKING ATTACHMENT FOR BINDERS.

Application filed April 12, 1921. Serial No. 460,824.

*To all whom it may concern:*

Be it known that I, ARTHUR CHRISTOPHERSON, a citizen of the United States, residing at Oslo, in the county of Marshall and State of Minnesota, have invented certain new and useful Improvements in Shocking Attachments for Binders, of which the following is a specification.

This invention relates to shocking attachments for binders, and the object is to provide an efficient, practical, simply constructed and easily operated device for shocking grain bundles made by a binder. The invention is described in the following specification and is clearly illustrated in the accompanying drawing, in which:

Fig. 1 is a top or plan outline view of a part of a binder equipped with my improved shocking device.

Fig. 2 is a side elevation of the machine as seen when looking from the right in Fig. 1.

Fig. 3 is a detail sectional view on the line 3—3 in Fig. 2.

Referring to the drawings by reference numerals 4 designates a binder of any well known type or construction, having a bull wheel 5, a bundle tying platform 6, and which is adapted to travel forwardly in the direction of the arrow A. Instead of the usual bundle carrier at the lower end of the platform 6, I provide a frame consisting of two spaced bars 7 and 8, which are curved upwardly at their rear ends into extensions 9 having slots 10. The upper ends of the extensions 9 are secured together by a rod 11, while a shaft 12 connects the front ends of the bars 7 and 8. A sleeve 13, having an arm 14, oscillatable on the shaft 12, and is provided with a series of rearwardly extending prongs 15. A spring 16 tends to hold the prongs 15 normally up, but they may be lowered by the operator through some suitable tripping device such as 17.

The bar 8 is secured to the binder by suitable brackets 18, and the bar 7 is provided with fixed upstanding brackets 19 which are braced to the binder by rods 20.

Journal blocks 21 are slidably but not rotatably mounted in the slots 10. A shaft 22 is journaled in the blocks 21, and is provided with a guide 23 which is so formed as to leave an opening between it and the shaft 22 toward the platform 6. The shaft 22 is further provided with a pin 24 adapted to stop against stops 25 so that the guard 23 will be limited to the two positions shown in Fig. 2, one of said positions being indicated by dotted lines 26.

In the operation and use of the device, as the grain bundles are tied and made in the usual manner on the platform 6, they are thrown out therefrom, their butt ends falling on the prongs 15 and their head ends slipping under the guard 23 and resting on the shaft 22. When a sufficient number of bundles to form a shock have accumulated the operator trips the lever arm 14 causing the butt end of the bundles to fall down upon the ground where they will stand in an inclined position against the shaft 22. As the machine then moves forward the bundles will be raised to an upright position, and the blocks 21 will slide up in the slots 10 until the shaft 22 will clear over the top of the bundles and leave them standing as a shock, which, with possibly a little rebuilding by hand will weather the elements very satisfactorily.

It is understood that suitable modifications may be made in the form and structure of this invention if such modifications come within the spirit and scope of the appended claims.

Having now therefore fully shown and described my invention what I claim to be new and desire to protect by Letters Patent is:

1. In combination with a binder, a frame adjacent the binding platform having an upwardly curved rear part having a slotted extension, a series of tines at the front end of the frame, adapted to receive the butt ends of grain bundles, a shaft slidably mounted in said extension and adapted to receive the head ends of the grain bundles, said shaft being adapted to slide rearwardly and upwardly in said extension, and means for tripping said tines, substantially as set forth.

2. In combination with a binder, a frame adjacent the binding platform thereof and having an upwardly curved rear part having a slotted extension, a series of tines tiltably mounted at the front end of the frame adapted to receive the butt ends of grain bundles, a shaft slidably mounted in said extension and adapted to receive the head ends of said bundles, said shaft being adapted to slide rearwardly and upwardly in said extension, a guiding arm secured on the shaft, and means for tripping said tines rearwardly when so desired.

3. In combination with a binder, a frame having a main portion and a slotted extension adjacent the binding platform thereof, a series of tiltably mounted tines in the front end of the frame and means for tilting the same, a shaft in the slotted extension of the frame adapted to slide rearwardly and upwardly therein, said slotted extension being upwardly and rearwardly curved from the main portion of the frame.

4. In combination with a binder, a frame adjacent the binding platform thereof, said frame having two horizontal main bars provided with upwardly curved and slotted extensions at their rear, blocks slidably mounted in said extensions, and a shaft mounted with its ends in said blocks, said shaft being adapted to receive and support the head ends of grain bundles delivered by the binder.

5. In combination with a binder, a frame adjacent the binding platform thereof, said frame having two horizontal main bars, the same having upwardly curved and slotted extensions at their rear, blocks slidably mounted in said extensions, a shaft oscillatively mounted with its ends in said blocks and means for limiting the turning movement of the shaft.

In testimony whereof I affix my signature.

ARTHUR CHRISTOPHERSON.